(12) United States Patent
Aigeldinger (10) Patent No.: US 7,137,558 B2
(45) Date of Patent: Nov. 21, 2006

(54) METHODS AND APPARATUS FOR FORMING BARCODE CHARACTERS

(75) Inventor: Charlie Aigeldinger, Madison Heights, VA (US)

(73) Assignee: R.R. Donnelley & Sons Company, Chicago, IL (US)

(*) Notice: Subject to any disclaimer, the term of this patent is extended or adjusted under 35 U.S.C. 154(b) by 99 days.

(21) Appl. No.: 10/782,469

(22) Filed: Feb. 19, 2004

(65) Prior Publication Data

US 2004/0164154 A1    Aug. 26, 2004

Related U.S. Application Data

(60) Provisional application No. 60/448,519, filed on Feb. 20, 2003.

(51) Int. Cl.
*G06K 7/10* (2006.01)
(52) U.S. Cl. ............... 235/462.16; 235/462.19; 235/462.25; 235/494
(58) Field of Classification Search .......... 235/462.19, 235/462.16, 462.25, 494
See application file for complete search history.

(56) References Cited

U.S. PATENT DOCUMENTS

| | | | | |
|---|---|---|---|---|
| 3,211,470 A | * | 10/1965 | Wilson | 283/85 |
| 3,654,435 A | * | 4/1972 | Vaccaro | 235/493 |
| 3,959,631 A | * | 5/1976 | Otten | 235/493 |
| 4,130,243 A | * | 12/1978 | Stevens | 235/487 |
| 4,308,455 A | * | 12/1981 | Bullis et al. | 235/462.07 |
| 4,728,784 A | * | 3/1988 | Stewart | 235/462.07 |
| 4,824,266 A | * | 4/1989 | Fujii et al. | 358/1.11 |
| 5,073,954 A | * | 12/1991 | Van Tyne et al. | 235/462.08 |
| 5,203,591 A | * | 4/1993 | Treat | 283/81 |
| 5,298,731 A | * | 3/1994 | Ett | 235/462.02 |
| 5,412,196 A | * | 5/1995 | Surka | 235/462.07 |
| 5,438,188 A | * | 8/1995 | Surka | 235/462.07 |
| 5,550,365 A | * | 8/1996 | Klancnik et al. | 235/462.25 |
| 5,918,080 A | * | 6/1999 | Yoshida | 396/207 |
| 6,032,863 A | * | 3/2000 | Nethery, III | 235/462.07 |
| 6,199,765 B1 | * | 3/2001 | Uhling | 235/494 |
| 6,502,752 B1 | * | 1/2003 | Oakeson et al. | 235/462.25 |
| 6,685,093 B1 | * | 2/2004 | Challa et al. | 235/462.46 |
| 2001/0035458 A1 | * | 11/2001 | Schum et al. | 235/462.08 |
| 2002/0113125 A1 | * | 8/2002 | Schuessler et al. | 235/462.1 |
| 2002/0134841 A1 | * | 9/2002 | Oakeson et al. | 235/462.25 |

* cited by examiner

*Primary Examiner*—Kimberly D. Nguyen
(74) *Attorney, Agent, or Firm*—Hanley, Flight & Zimmerman, LLC.

(57) ABSTRACT

Methods and apparatus described herein form barcode characters by determining a number of pixels associated with forming a first bar and a second bar of a first barcode character. A separation width value associated with the first bar and the second bar is determined based on the number of pixels. A second separation width value is then generated based on the at least one separation width value. A barcode character is then formed based on the second separation width value.

54 Claims, 9 Drawing Sheets

METHODS AND APPARATUS FOR FORMING BARCODE CHARACTERS

RELATED APPLICATION

This application claims the benefit of the filing date of U.S. Provisional Patent Application No. 60/448,519 filed on Feb. 20, 2003.

TECHNICAL FIELD

The present application relates in general to barcodes and, in particular, to methods and apparatus for forming barcode characters.

BACKGROUND

Barcode characters are used to encode information in a form that is readable by a barcode scanning machine. Typically, a barcode character includes alternating areas of black and white in various shapes and sizes to encode letters and/or numbers. White areas of a barcode tend to reflect light, while black areas of a barcode tend to absorb light. A barcode scanner reads a barcode by emitting light on the barcode and detecting a pattern of reflected light reflected from the barcode.

Typically, a barcode scanner (including associated decoding logic) can consistently read a range of shapes or sizes of black and white bars. Barcodes that are too small and barcodes that are too large for the scanner may not be read correctly. For many types of barcode scanners, this range is specified by a number of bars per inch (bpi) the scanners are equipped to handle. Typically, the bars per inch specification includes an optimum point and a tolerance range. For example, the United States Postal Service (USPS) uses a barcode scanning system called Merlin to read zip codes on bulk mailings. The Merlin system has a bars per inch specification of 22 bpi±2 bpi. Mail that includes a destination zip code in barcode format that can be read by the Merlin system receives a discounted postal rate. Mail that is rejected by the Merlin system for failure to read the barcoded zipcode does not receive the discounted postal rate.

Many printers used to print barcodes create the black areas of the barcode by printing a plurality of black dots called pixels. However, printers are typically only capable of printing some finite number of black dots or pixels within a predetermined area. Typically, the resolution associated with a printer is specified as the maximum dots per inch (dpi) of the printer. For example, a Scitex printer, which is often used to print bar-coded zipcodes on mail, has a dots per inch specification of 120 dpi.

If the printer resolution is relatively large and/or the number of bars per inch desired is relatively low, barcode characters that meet the bpi specification with uniform black bar thickness and uniform white space thickness may be produced by the printer. However, if the printer resolution is relatively low and/or the number of bars per inch desired is relatively high, barcode characters that meet the bpi specification with uniform black bar thickness and uniform white space thickness may not be produced by the printer.

DETAILED DESCRIPTION

In general, the methods and apparatus described herein create barcode characters having dissimilar, unequal or non-uniform white spaces from barcode characters having uniform or equal white spaces to match a bars per inch (bpi) specification with a dot per inch (dpi) specification. The term white space may be defined as the separation space between bars that form a barcode and is not necessarily associated with the color of the space. One or more columns or portion of white space is removed from or added to an existing barcode font to decrease (or increase) the width of each barcode character in the font. By decreasing the width of a barcode character, the number of bars per inch is increased. In one example, single pixel columns of white space are removed from or added to one or more white space areas, but not from other white space areas, to accommodate the printing resolution of a particular printer. Of course, new barcode fonts with dissimilar or unequal white spaces may also be generated instead of modifying existing barcode fonts with uniform white space.

Figure 1:
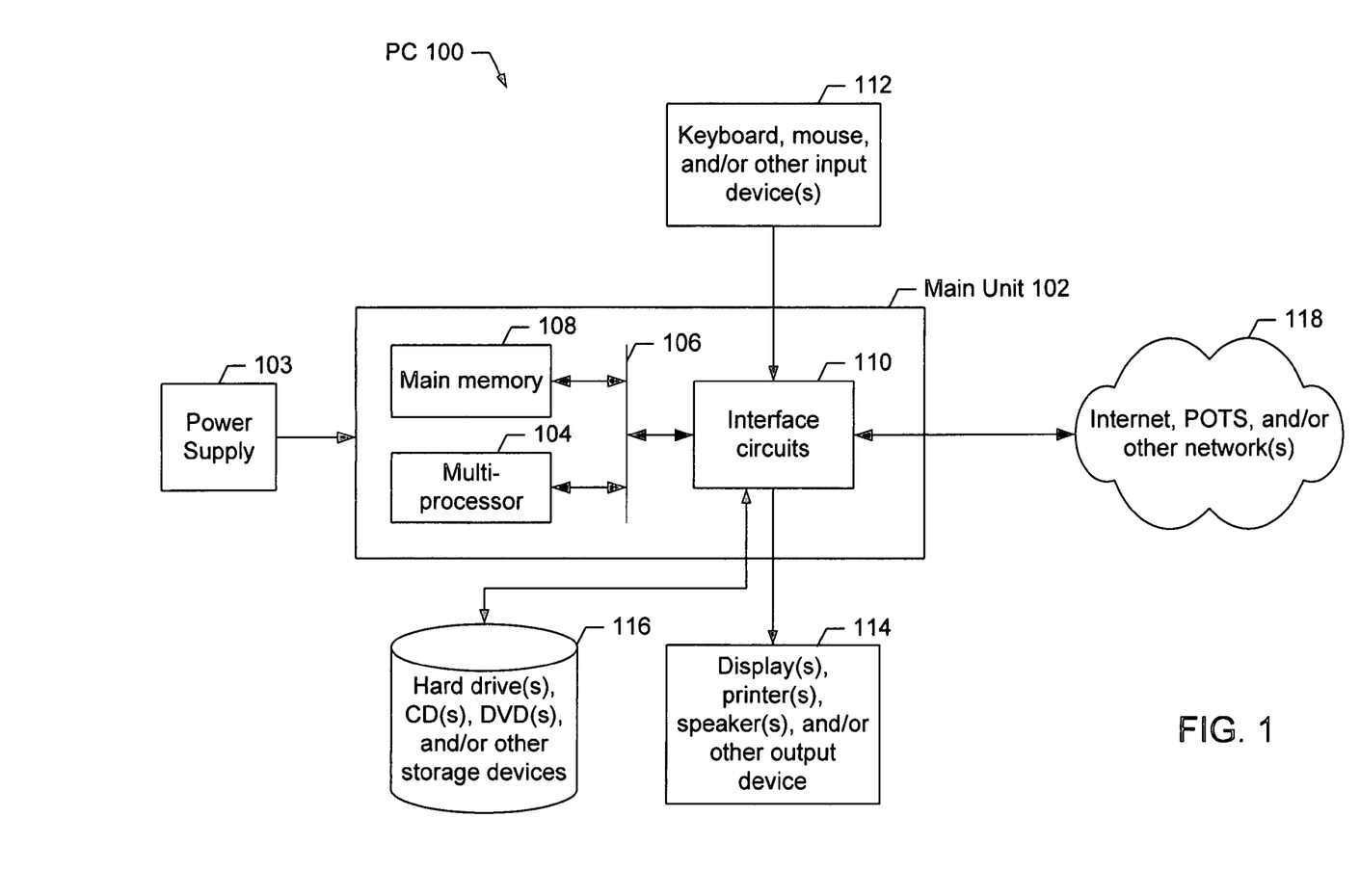
FIG. 1 is a block diagram of a computer system that may be used to implement the apparatus and methods described herein.

A block diagram of a computer system 100 that may be used to create and/or modify barcode characters as described herein is illustrated in FIG. 1. The computer system 100 may be a personal computer (PC) or any other computing device. The illustrated computer system 100 includes a main processing unit 102 powered by a power supply 103. The main processing unit 102 may include a multi-processor unit 104 electrically coupled by a system interconnect 106 to a main memory device 108 and one or more interface circuits 110. In this example, the system interconnect 106 is an address/data bus. Of course, a person of ordinary skill in the art will readily appreciate that interconnects other than busses may be used to connect the multi-processor unit 104 to the main memory device 108. For example, one or more dedicated lines and/or a crossbar may be used to connect the multi-processor unit 104 to the main memory device 108.

The multi-processor unit 104 may include any type of well-known central processing unit (CPU), such as a microprocessor from the Intel Pentium® family of microprocessors, the Intel Itanium® family of microprocessors, and/or the Intel XScale® family of processors. In addition, the multi-processor 104 may include any type of well-known cache memory, such as static random access memory (SRAM). The main memory device 108 may include dynamic random access memory (DRAM), but may also include non-volatile memory. In one example, the main memory device 108 stores a software program that is executed by one or more processing agents within the multi-processor 104 in a well-known manner.

The interface circuit(s) 110 may be implemented using any type of well-known interface standard, such as an Ethernet interface and/or a Universal Serial Bus (USB) interface. One or more input devices 112 may be connected to the interface circuits 110 for entering data and commands into the main processing unit 102. For example, an input device 112 may be a keyboard, mouse, touch screen, track pad, track ball, isopoint, and/or a voice recognition system.

One or more displays, printers, speakers, and/or other output devices 114 may also be connected to the main processing unit 102 via one or more of the interface circuits 110. The display 114 may be a cathode ray tube (CRT), a liquid crystal display (LCD), or any other type of display. The display 114 may generate visual indications of data generated during operation of the main processing unit 102. The visual displays may include prompts for human operator input, calculated values, detected data, etc.

The computer system 100 may also include one or more storage devices 116. For example, the computer system 100 may include one or more hard drives, a compact disk (CD) drive, a digital versatile disk drive (DVD), and/or any other computer media input/output (I/O) devices.

The computer system 100 may also exchange data with other devices via a connection to a network 118. The network connection may be any type of network connection, such as an Ethernet connection, digital subscriber line (DSL), telephone line, coaxial cable, etc. The network 118 may be any type of network, such as the Internet, a telephone network, a cable network, and/or a wireless network.

Figure 2A:
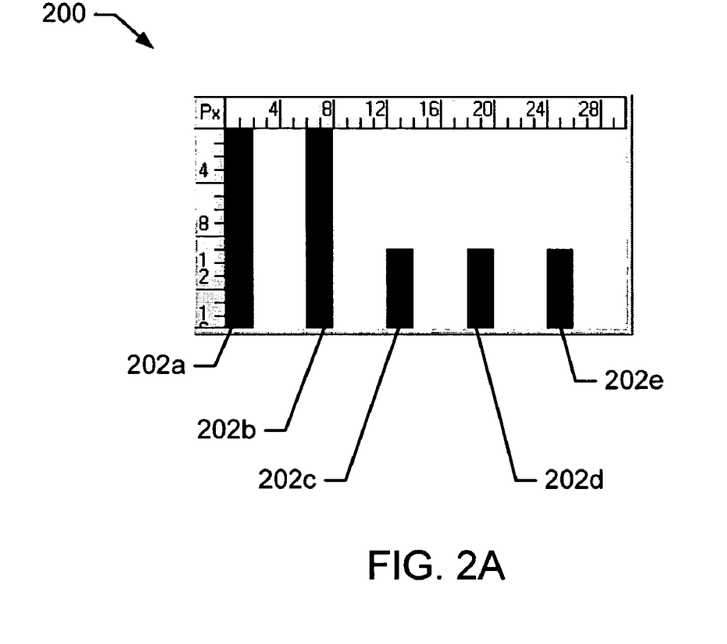
FIG. 2A is a graphic depiction of a barcode representing a "0" character with uniform white space.

FIG. 2A is a graphic depiction of an example barcode 200 (i.e., an example barcode character) representing a "0" character with uniform white space. In particular, the example barcode character 200 is part of a barcode font and includes five bars 202a, 202b, 202c, 202d, and 202e having substantially equal widths (i.e., bars of uniform width) separated by white spaces of uniform width. In this example, each of the bars 202a–202e is two pixels wide and each white space is four pixels wide. Additionally, the five bars 202a–e may have different heights. A value for the example barcode character 200 is coded based on the height differences between the bars 202a–202e. For example, as shown in FIG. 2A, the "0" character is coded using two tall bars, each fifteen pixels high, followed by three short bars, each six pixels high. Other barcode characters having white spaces of uniform width are shown in FIGS. 5A, 6A, 7A, 8A, 9A, 10A, 11A, 12A, and 13A.

Figure 2B:
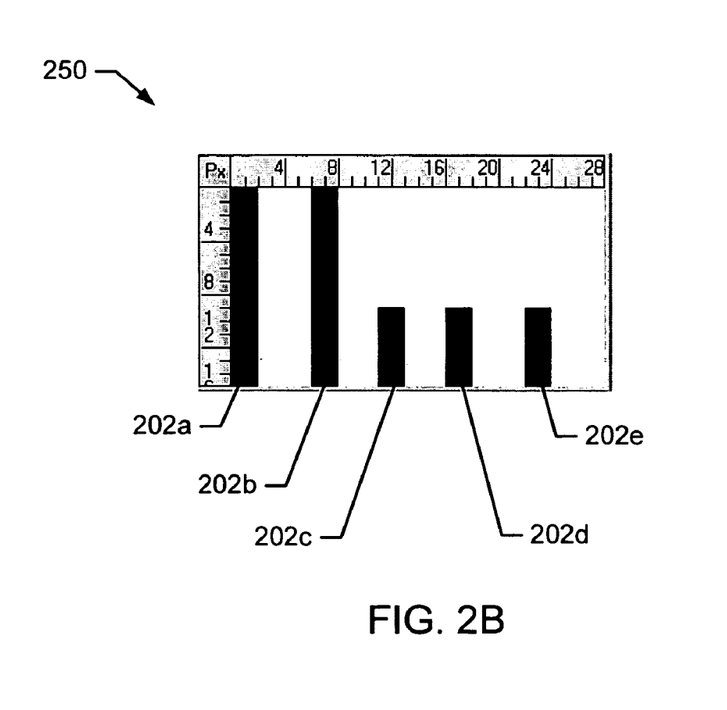
FIG. 2B is a graphic depiction of a barcode representing a "0" character with dissimilar white space.

FIG. 2B is a graphic depiction of an example barcode character 250 representing a "0" character with dissimilar (e.g., non-uniform, unequal, etc.) white spaces. In particular, the example barcode character 250 includes the five bars 202a–202e separated by white spaces having unequal widths (i.e., white spaces of dissimilar or unequal width). For example, the bar 202a and the bar 202b are separated by a white space having a width of four pixels. However, the bar 202b and the bar 202c are separated by a white space having a width of three pixels. Other barcode characters having white spaces of dissimilar widths are shown in FIGS. 5B, 6B, 7B, 8B, 9B, 10B, 11B, 12B, and 13B.

The example barcode character 250 may be created based on the example barcode character 200 of FIG. 2A using the methods and apparatus described herein. For example, as described in greater detail below in connection with FIG. 3, the positions of the bars 202a–202e may be modified by adding or removing columns or portions of white space between the bars 202a–202e. In other words, the bars 202a–202e may be shifted to be further apart or closer together to form barcode characters having white spaces of dissimilar, unequal, or non-uniform width.

Barcode characters (e.g., the barcode characters 200 and 250 of FIGS. 2A and 2B) may be printed using a printing system such as, for example, laser printing systems, dot matrix printing systems, etc. Printing systems may be categorized by printing resolution capabilities. Printing resolution capabilities are typically specified using a dots per inch specification.

The dots per inch specification is the number of pixels a particular printing system optimally prints in an inch of space. Typically, one pixel of unprinted white space consumes approximately the same area as a printed pixel. For example, a Scitex printer, which is often used to print bar-coded zip codes on mail, has a dots per inch specification of 120 dpi. The dots per inch specification may be directly related to the widths of the bars and the white spaces of a barcode character. The widths of the bars (e.g., the bars 202a–202e of FIG. 2) and the white spaces typically define the number of bars that can be printed within a predetermined space, which is known in the art as a bars per inch specification.

The bars per inch specification is the number of bars a particular barcode scanning system is configured to receive, detect, or read within a one inch width of space to decode barcodes while producing the fewest or an acceptable number of read errors. Typically, the bars per inch specification includes an optimal value and a tolerance range. For example, the United States Postal Service (USPS) uses a barcode scanning system called Merlin to read zip codes on bulk mailings. The Merlin system has a bars per inch specification of 22 bpi±2 bpi. Mail that includes a destination zip code in barcode format that can be read by the Merlin system receives a discounted postal rate. Mail that is rejected by the Merlin system for failure to read the barcoded zip code does not receive the discounted postal rate.

Figure 3:
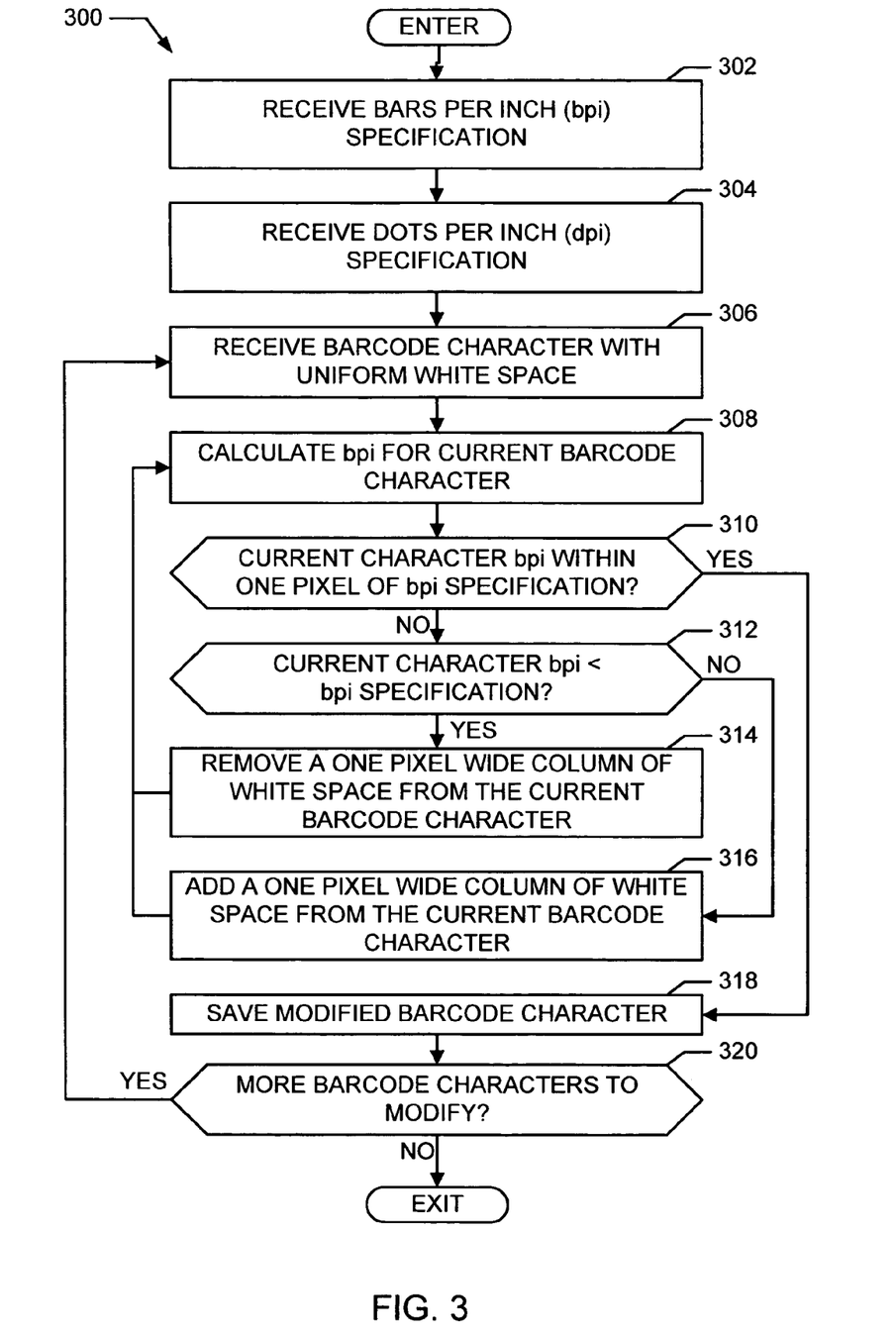
FIG. 3 is a flowchart of an example process for creating barcode characters with dissimilar white space from barcode characters with uniform white space.

A flowchart of an example process 300 for creating barcode characters with dissimilar white space from barcode characters with uniform white space is illustrated in FIG. 3.

Preferably, the example process 300 is embodied in a software program. However, some or all of the operations of the example process 300 may be performed manually and/or by another device. Although the example process 300 is described with reference to the flowchart illustrated in FIG. 3, a person of ordinary skill in the art will readily appreciate that many other methods of performing the operations associated with example process 300 may be used. For example, the order of one or more of the operations may be changed. In addition, one or more of the operations described are optional.

Generally, the example process 300 creates barcode characters with dissimilar white space from barcode characters with uniform white space to match a bars per inch specification with a dots per inch specification. White space is removed from or added to an existing barcode font in order to decrease (or increase) the width of each barcode character in the barcode font. By decreasing the width of the barcode character, the number of bars per inch is increased. Single columns of white space may be removed from or added to one or more white spaces between bars, but not from other white spaces, in order to accommodate the printing resolution of a particular printer. Of course, new barcode fonts with dissimilar white spaces may also be created instead of modifying barcode fonts with uniform white spaces.

The example process 300 begins when the computer 100 and/or an operator receives a bars per inch specification (block 302). The bars per inch specification may be received from a barcode reading system such as, for example, the Merlin system described above. Alternatively, the bars per inch specification may be received from a memory (e.g., one of the storage devices 116 of FIG. 1) and/or any other location used to store the bars per inch specification.

The computer 100 and/or the operator also receive a dots per inch specification (block 304). The dots per inch specification may be associated with a printing system used to print barcode characters (e.g., the barcode characters 200 and 250 of FIGS. 2A and 2B). Additionally, the dots per inch specification may be received from the printing system (e.g., the Scitex printer used to print barcoded zip codes on mail), the storage device 116 (FIG. 1), and/or any other location used to store the dots per inch specification.

A barcode character (i.e., a current barcode character) from a barcode font with uniform white space is then loaded into the computer 100 (block 306). For example, the example barcode character 200 of FIG. 2A may be loaded from the storage device 116 of FIG. 1.

A character bpi is then determined for the current barcode character (block 308). The character bpi may be defined as the number of bars of a barcode character that can be printed in one inch of space. The character bpi may be determined based on the dpi specification and the total number of pixels $P_T$ that form the widths of bars and white spaces in the current barcode character (i.e., the pixels per barcode character value $P_T$). The pixels per barcode character value $P_T$ may be determined according to Equation 1 below.

$$P_T = B \times PPB + WS \times PPW \qquad \text{Equation 1}$$

As shown above in Equation 1, the pixels per barcode character value $P_T$ may be determined by adding the total number of bar pixels (i.e., B×PPB) to the total number of white space pixels (i.e., WS×PPW). The total number of bar pixels may be determined by multiplying the number of bars B in a barcode character by the number of pixels per bar width PPB. The total number of white space pixels may be determined by multiplying the number of white spaces WS in a barcode character by the number of pixels per white space PPW.

In this example, the pixels per barcode character value $P_T$ for the current barcode character loaded at block 306 is equal to thirty (i.e., five bars B per barcode character, two pixels per bar PPB, five white spaces WS per barcode character, and four pixels per white space PPW). The space occupied by the current barcode character BCS is equal to 0.25 inches, which may be determined by dividing the pixels per barcode character value $P_T$ (e.g., 30 pixels for the current barcode character) by the dpi specification (e.g., 120 dpi). The character bpi may then be determined according to Equation 2 below.

$$\text{character } bpi = (1/BCS \text{ inch}) \times B \qquad \text{Equation 2}$$

As shown in Equation 2, the character bpi may be determined by performing an inverse operation on the space occupied by a barcode character BCS or dividing one by the space occupied by a barcode character BCS and multiplying the result by the number of bars B in the barcode character. Accordingly, the character bpi for the current barcode character is twenty because the space occupied by the current barcode character BCS is 0.25 inches and the number of bars B in the current barcode character is five. Thus, one inch of space can accommodate four barcode characters having the same pixels per barcode character value $P_T$ as the current barcode character (i.e., 30 pixels per barcode character).

If the current barcode character loaded at block 306 is modified by reducing the width of the white spaces from four pixels to three pixels, the total number of pixels occupied by the current barcode character is equal to twenty-five (i.e., five bars B per barcode character, two pixels per bar PPB, five white spaces WS per barcode character, and three pixels per white space PPW). Therefore, the modified barcode character printed at 120 dpi occupies 0.208333 inches. According two Equation 2 above, the character bpi of the modified barcode character is twenty-four (i.e., space occupied by the modified barcode character BCS is 0.208333 inches and the number of bars B in the modified barcode character is five), thus one inch of space may accommodate 4.8 modified barcode characters.

After the character bpi is determined at block 308, the example process 300 determines if the character bpi is within one pixel of the bpi specification received at block 302 (block 310). The character bpi and the bpi specification may be compared by determining the pixels per barcode character value $P_T$ of an ideal barcode character and the pixels per barcode character value $P_T$ of the current barcode character and comparing the pixels per barcode character values $P_T$ to one another. Given a bpi specification of 22 bpi and a dpi specification of 120 dpi, the pixels per barcode character value $P_T$ for an ideal barcode character having five bars and associated white spaces is equal to 27.27 pixels (i.e., (5 bars/22 bpi)*120 dpi).

Referring to the example barcode character 200 illustrated in FIG. 2A, the pixels per barcode character value $P_T$ of the example barcode character 200 is equal to thirty (i.e., five bars B per barcode character, two pixels per bar PPB, five white spaces WS per barcode character, and four pixels per white space PPW). Therefore, the character bpi cannot be used to generate a barcode character within one pixel of a barcode character generated based on the bpi specification (i.e., 30 pixels–27.27 pixels>1 pixel) and the character bpi is not within one pixel of the bpi specification.

If the character bpi is not within one pixel of the bpi specification, the example process 300 determines if the character bpi is less than the bpi specification (block 312). If the character bpi is less than the bpi specification, a one pixel wide column or portion of white space is removed from the current barcode character (block 314). For example, removing white space from the example barcode character 200 reduces the width of the barcode character while leaving the number of bars (e.g., the bars 202a–202e of FIG. 2) intact and may create the example barcode character 250 of FIG. 2B. As a result, the number of bars per inch associated with the barcode character increases and the difference between the character bpi and the bpi specification decreases. In addition, the resulting barcode character has dissimilar white spaces or white spaces of unequal width between bars as shown by the example barcode character 250 of FIG. 2B. If white space has already been removed from the current barcode character, any other removal of white space is preferably distributed across multiple white spaces. For example, if a portion of white space is removed during a first iteration of block 314, during a second iteration, another portion of white space may be removed from a white space other than the white space modified during the first iteration. In other words, if control is passed to block 314 multiple times during the execution of the example process 300, multiple one pixel wide columns of white space may be removed from the current barcode character. In this case, a one pixel wide column of white space may be removed from a different white space for each iteration of block 314. For example, during a first iteration of block 314, a one pixel wide column of white space may be removed from the white space between the bars 202a and 202b. However, during a second iteration of block 314, a one pixel wide column of white space may be removed from the white space between the bars 202b and 202c. After a one pixel wide column of white space is removed (block 314), control is passed back to block 308.

If the character bpi is not within one pixel of the bpi specification (block 310), and the character bpi is not less than the bpi specification (block 312), a one pixel wide column of white space is added to the current barcode character (block 316). Adding white space to the current barcode character increases the width of the current barcode character while leaving the number of bars (e.g., the bars 202a–202e of FIG. 2) intact. As a result, the number of bars per inch associated with the barcode character decreases. In addition, the resulting barcode character has dissimilar white spaces or white spaces of unequal width between bars. If white space has already been added to the current barcode character, any other addition of white space is preferably distributed across multiple spaces. In other words, if control is passed to block 316 multiple times during the execution of the example process 300, multiple one pixel wide columns of white space may be added to the current barcode character. In this case, a one pixel wide column of white space may be added to a different white space for each iteration of block 316. For example, during a first iteration of block 316, a one pixel wide column of white space may be added to the white space between the bars 202a and 202b. However, during a second iteration of block 316, a one pixel wide column of white space may be added to the white space between the bars 202b and 202c. After a one pixel wide column of white space is added (block 316), control is passed back to block 308.

If the character bpi is within one pixel of the bpi specification (block 310), the example process 300 saves the modified barcode character (block 318). The example process 300 may save the modified barcode character in, for example, the storage device 116 (FIG. 1) or a printing system. It is then determined if there are more barcode characters in the barcode font to be modified (block 320). If there are more barcode characters in the barcode font to be modified, the process repeats starting at block 306. If there are no more barcode characters in the barcode font to be modified, the process ends.

An alternative configuration of the example process 300 can create (e.g., originate) a barcode character instead of modifying existing barcode characters. For example, as described in connection with block 310 above, the number of pixels occupied by an ideal barcode character may be determined based on a bpi specification, a dpi specification, and the total number of bars per barcode character $P_T$. Separation widths or white space widths between bars may then be determined based on the number of pixels of an ideal barcode character.

Figure 4:
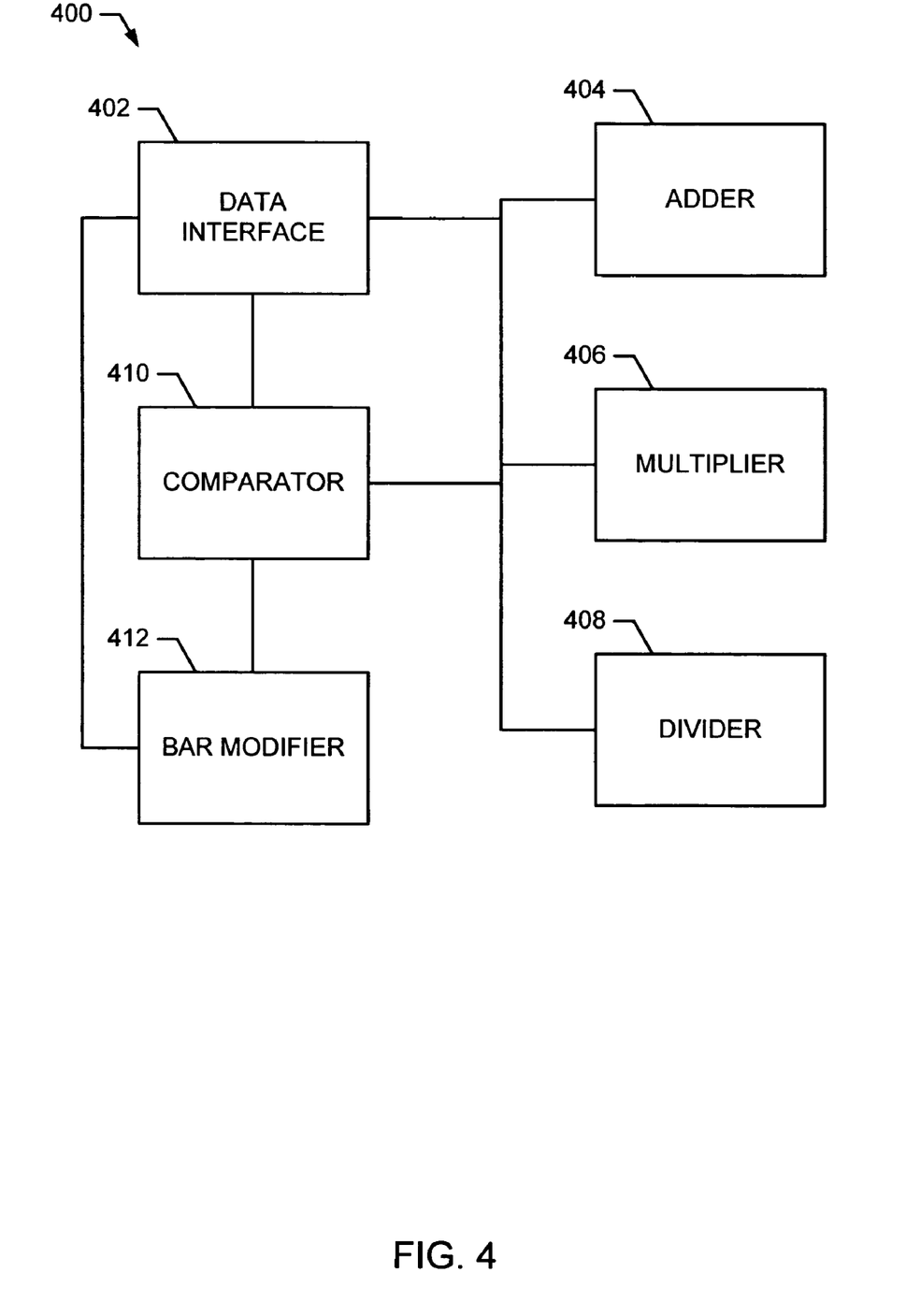
FIG. 4 is a block diagram of an example system for creating barcode characters.
Figure 5A:
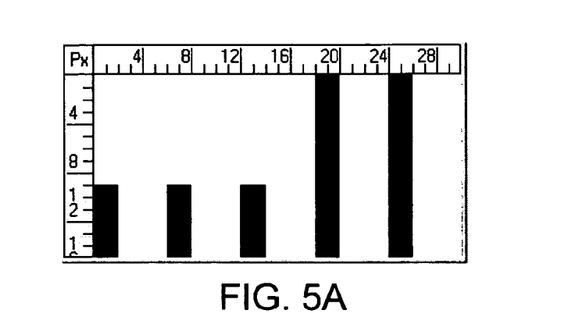
FIG. 5A is a graphic depiction of a barcode representing a "1" character with uniform white space.
Figure 5B:
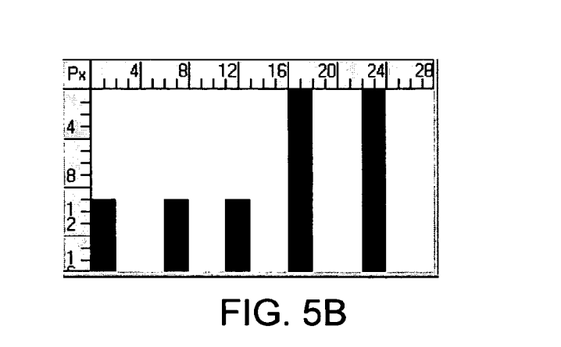
FIG. 5B is a graphic depiction of a barcode representing a "1" character with dissimilar white space.
Figure 6A:
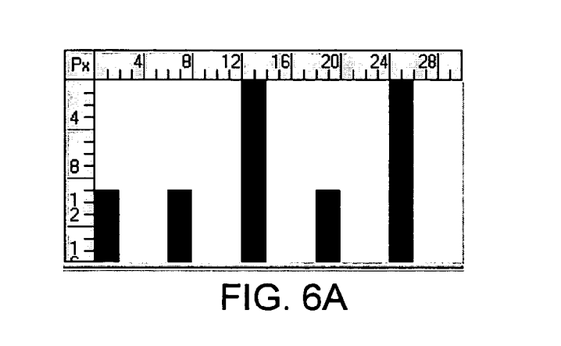
FIG. 6A is a graphic depiction of a barcode representing a "2" character with uniform white space.
Figure 6B:
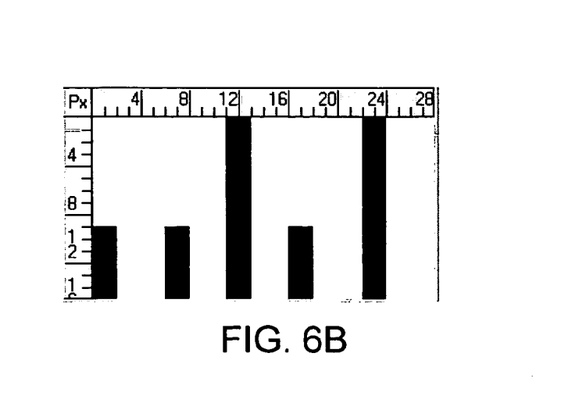
FIG. 6B is a graphic depiction of a barcode representing a "2" character with dissimilar white space.
Figure 7A:
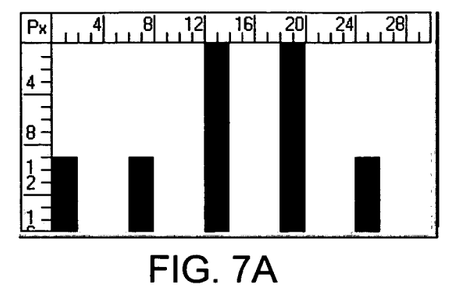
FIG. 7A is a graphic depiction of a barcode representing a "3" character with uniform white space.
Figure 7B:
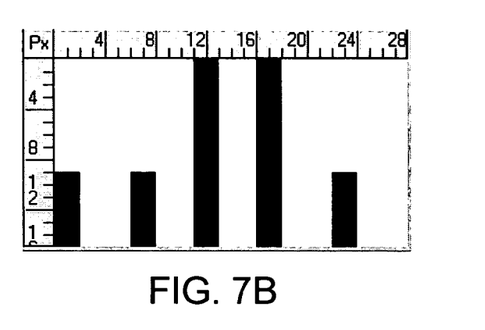
FIG. 7B is a graphic depiction of a barcode representing a "3" character with dissimilar white space.
Figure 8A:
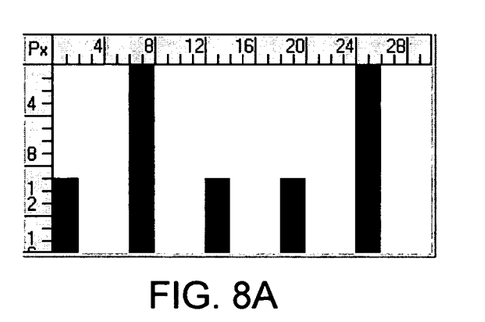
FIG. 8A is a graphic depiction of a barcode representing a "4" character with uniform white space.
Figure 8B:
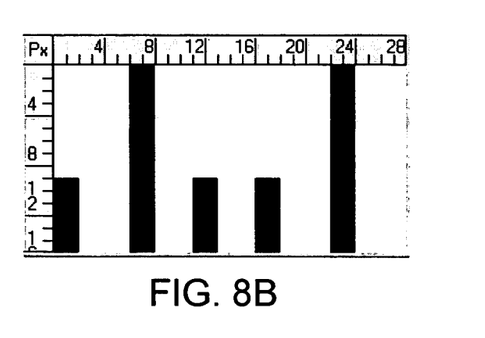
FIG. 8B is a graphic depiction of a barcode representing a "4" character with dissimilar white space.
Figure 9A:
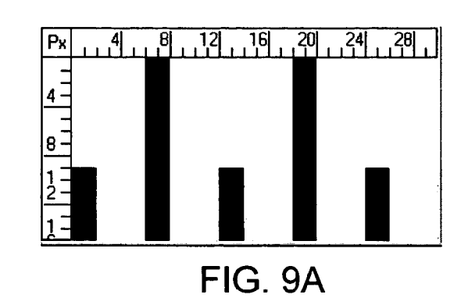
FIG. 9A is a graphic depiction of a barcode representing a "5" character with uniform white space.
Figure 9B:
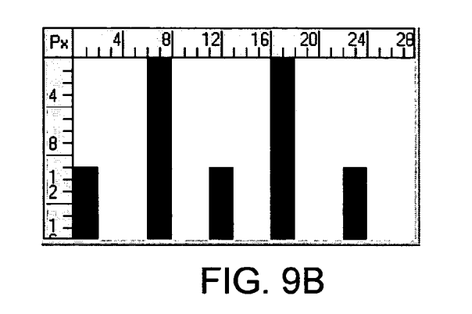
FIG. 9B is a graphic depiction of a barcode representing a "5" character with dissimilar white space.
Figure 10A:
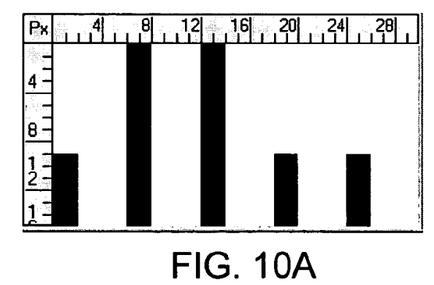
FIG. 10A is a graphic depiction of a barcode representing a "6" character with uniform white space.
Figure 10B:
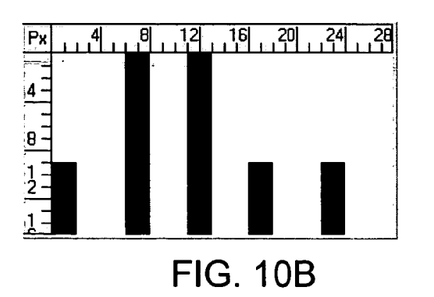
FIG. 10B is a graphic depiction of a barcode representing a "6" character with dissimilar white space.
Figure 11A:
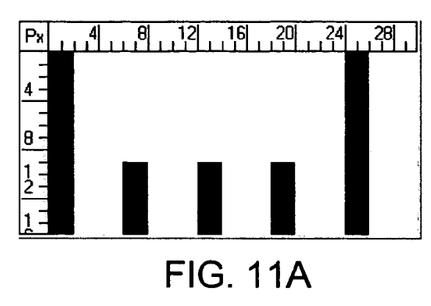
FIG. 11A is a graphic depiction of a barcode representing a "7" character with uniform white space.
Figure 11B:
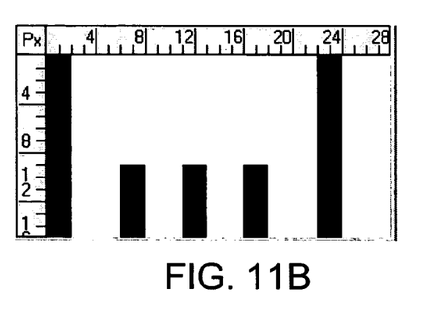
FIG. 11B is a graphic depiction of a barcode representing a "7" character with dissimilar white space.
Figure 12A:
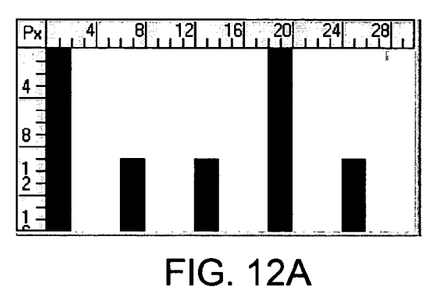
FIG. 12A is a graphic depiction of a barcode representing a "8" character with uniform white space.
Figure 12B:
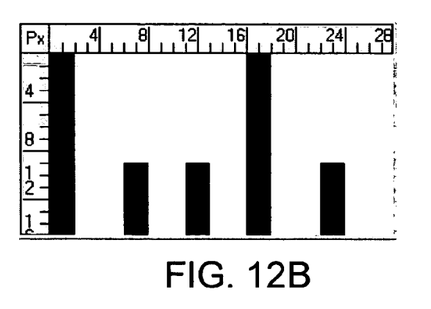
FIG. 12B is a graphic depiction of a barcode representing a "8" character with dissimilar white space.
Figure 13A:
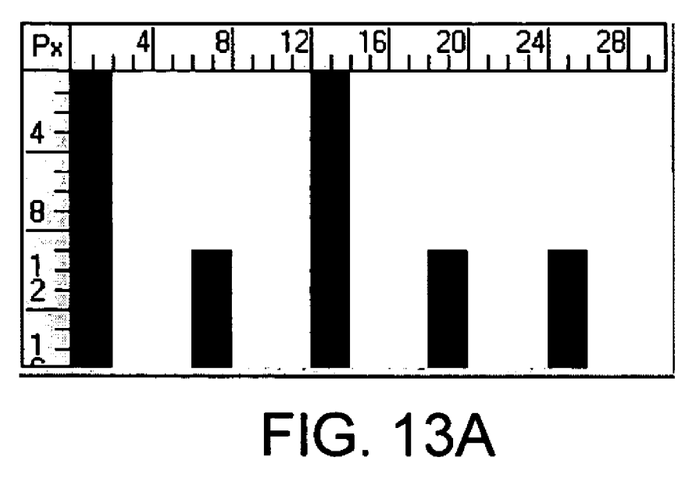
FIG. 13A is a graphic depiction of a barcode representing a "9" character with uniform white space.
Figure 13B:
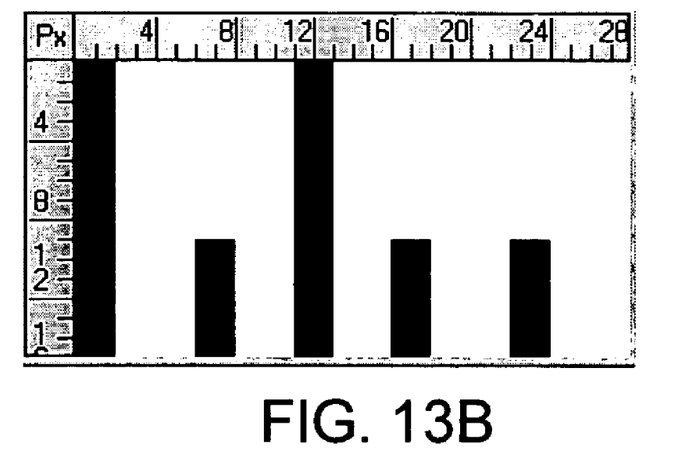
FIG. 13B is a graphic depiction of a barcode representing a "9" character with dissimilar white space.

FIG. 4 is a block diagram of an example system 400 for creating barcode characters (e.g., the example barcode characters 200 and 250 of FIGS. 2A and 2B). The example system 400 may be implemented using a hardware system configured to perform the example process 300 of FIG. 3. In particular, the example system 400 may be configured to modify the width of barcode characters based on dots per inch specifications and bars per inch specifications as described above in connection with FIG. 3. The example system 400 includes a data interface 402, an adder 404, a multiplier 406, a divider 408, a comparator 410, and a bar modifier 412, all of which may be communicatively coupled as shown.

The data interface 402 may be configured to obtain barcode characters, dots per inch specifications, and bars per inch specifications from, for example, a memory (e.g., the storage device 116 of FIG. 1). Additionally, or alternatively, the data interface 402 may be communicatively coupled to a barcode reader and a printing system and may obtain bars per inch specifications from the barcode reader (e.g., the Merlin system described above) and dots per inch specifications from the printing system (e.g., a Scitex printer used to print barcoded zip codes on mail). Additionally, the data interface 402 may be configured to store barcode characters including modified barcode characters in, for example, the storage device 116, a printing system, etc.

The adder 404, the multiplier 406, and the divider 408 may be used in a cooperative manner to determine values associated with creating barcode characters. For example, the adder 404 and the multiplier 406 may be configured to determine the number of pixels in a barcode character according to Equation 1 above. The divider 408 may then be configured to determine the space (e.g., linear inches) occupied by a barcode character based on the number of pixels in a barcode character and a dpi specification (e.g., space=(pixels per barcode character)/(dpi specification)). Additionally, the adder 404, the multiplier 406, and the divider 408 may be used to determine a character bpi and the number of barcode characters that fit in one inch of space as described above in connection with block 308 of FIG. 3. The adder 404, the multiplier 406, and the divider 408 may also be configured to communicate bpi values and/or any other results to the data interface 402 and/or the comparator 410.

The comparator 410 may be configured to compare values such as, for example, the pixels per barcode character values $P_T$. For example, a first pixels per barcode character value associated with a character bpi and a second pixels per barcode character value associated with the bpi specification may be determined by the adder 404, the multiplier 406, and/or the divider 408 and communicated to the comparator 410. Alternatively, the comparator 410 may obtain the first and second pixel per barcode character values $P_T$ from the data interface 402. The comparator 410 may then compare the first pixels per barcode character value with the second pixels per barcode character value as described above in connection with block 312 of FIG. 3.

The bar modifier 412 may be configured to modify bars (e.g., the bars 202a–202e of FIG. 2) based on comparison results received from the comparator 410. The bars may be modified or shifted by removing or adding white space as described above in connection with blocks 314 and 316 of FIG. 3. For example, if the comparator 410 determines that the character bpi is less than the bpi specification, the bar modifier 412 may be configured to remove a one pixel wide column or portion of white space from a barcode character, thereby shifting one or more bars. Alternatively, if the comparator 410 determines that the character bpi is greater than the bpi specification, the bar modifier 412 may be configured to shift or modify one or more bars by adding a one pixel wide column or portion of white space to a barcode character. The bar modifier 412 may communicate barcode characters to the data interface 402.

In summary, persons of ordinary skill in the art will readily appreciate that methods, apparatus, and articles of manufacture for creating barcode characters have been provided. The foregoing description has been presented for the purposes of illustration and description. It is not intended to be exhaustive or to limit this patent to the examples disclosed. Many modifications and variations are possible in light of the above teachings. It is intended that the scope of the invention not be limited by this detailed description of examples.

What is claimed is:

1. A method for forming a barcode character, comprising:
   determining a number of pixels associated with forming at least a first bar and a second bar of a first barcode character;
   determining at least one separation width value associated with the first bar and the second bar based on the number of pixels;
   generating a second separation width value based on the at least one separation width value; and
   forming the barcode character based on the second separation width value.

2. A method as defined in claim 1, wherein the number of pixels is associated with a dots per inch value of a printing system.

3. A method as defined in claim 1, further comprising:
   obtaining a dots per inch value;
   obtaining a bars per inch value; and
   obtaining a bars per barcode character value, wherein the number of pixels is determined based on the dots per inch value, the bars per inch value, and the bars per barcode character value.

4. A method as defined in claim 3, wherein the bars per inch value is associated with a barcode reader.

5. A method as defined in claim 1, wherein the width of the at least one separation width value is less than the width of the second separation width value.

6. A method as defined in claim 1, wherein the width of the at least one separation width value is greater than the width of the second separation width value.

7. A method as defined in claim 1, wherein a second barcode character value is generated based on the second separation width value.

8. An apparatus for forming a barcode character, comprising:
   a processor system including a memory; and
   instructions stored in the memory that enable the processor system to:
      determine a number of pixels associated with forming at least a first bar and a second bar of a first barcode character;
      determine at least one separation width value associated with the first bar and the second bar based on the number of pixels;
      generate a second separation width value based on the at least one separation width value; and
      form the barcode character based on the second separation width value.

9. An apparatus as defined in claim 8, wherein the number of pixels is associated with a dots per inch value of a printing system.

10. An apparatus as defined in claim 8, wherein the instructions stored in the memory enable the processor system to:
   obtain a dots per inch value;
   obtain a bars per inch value; and
   obtain a bars per barcode character value, wherein the number of pixels is determined based on the dots per inch value, the bars per inch value, and the bars per barcode character value.

11. An apparatus as defined in claim 10, wherein the bars per inch value is associated with a barcode reader.

12. An apparatus as defined in claim 8, wherein the width of the at least one separation width value is less than the width of the second separation width value.

13. An apparatus as defined in claim 8, wherein the width of the at least one separation width value is greater than the width of the second separation width value.

14. An apparatus as defined in claim 8, wherein a second barcode character value is generated based on the second separation width value.

15. A machine accessible medium having instructions stored thereon that, when executed, cause a machine to:
   determine a number of pixels associated with forming at least a first bar and a second bar of a first barcode character;
   determine at least one separation width value associated with the first bar and the second bar based on the number of pixels;
   generate a second separation width value based on the at least one separation width value; and
   form the barcode character based on the second separation width value.

16. A machine accessible medium as defined in claim 15, wherein the number of pixels is associated with a dots per inch value of a printing system.

17. A machine accessible medium as defined in claim 15 having instructions stored thereon that, when executed, cause the machine to:
   obtain a dots per inch value;
   obtain a bars per inch value; and
   obtain a bars per barcode character value, wherein the number of pixels is determined based on the dots per inch value, the bars per inch value, and the bars per barcode character value.

18. A machine accessible medium as defined in claim 17, wherein the bars per inch value is associated with a barcode reader.

19. A machine accessible medium as defined in claim 15, wherein the width of the at least one separation width value is less than the width of the second separation width value.

20. A machine accessible medium as defined in claim 15, wherein the width of the at least one separation width value is greater than the width of the second separation width value.

21. A machine accessible medium as defined in claim 15, wherein a second barcode character value is generated based on the second separation width value.

22. A method for creating a barcode character, comprising:
    determining a first number of pixels associated with forming a first barcode character;
    determining a second number of pixels associated with forming a second barcode character;
    comparing the first number of pixels with the second number of pixels; and
    modifying at least one of a plurality of separation spaces associated with the first barcode character based on the comparison of the first number of pixels and the second number of pixels.

23. A method as defined in claim 22, wherein the first barcode character is associated with a barcode font.

24. A method as defined in claim 22, wherein the second barcode character is associated with a reading capability of a barcode reader.

25. A method as defined in claim 24, wherein the barcode reader is associated with a bars per inch value, and wherein the bars per inch value is associated with determining the second number of pixels.

26. A method as defined in claim 22, wherein the first number of pixels is determined based on a dots per inch value.

27. A method as defined in claim 26, wherein the dots per inch value is associated with a printing system.

28. A method as defined in claim 22, wherein modifying the at least one of the plurality of separation spaces includes at least one of removing a portion of separation space and adding a portion of separation space.

29. A method as defined in claim 22, wherein a width of a first one of the plurality of separation spaces is greater than a width of a second one of the plurality of separation spaces.

30. A method as defined in claim 22, wherein a width of a first one of the plurality of separation spaces is less than a width of a second one of the plurality of separation spaces.

31. An apparatus for creating a barcode character, comprising:
    a processor system including a memory; and
    instructions stored in the memory that enable the processor system to:
      determine a first number of pixels associated with forming a first barcode character;
      determine a second number of pixels associated with forming a second barcode character;
      compare the first number of pixels with the second number of pixels; and
      modify at least one of a plurality of separation spaces associated with the first barcode character based on the comparison of the first number of pixels and the second number of pixels.

32. An apparatus as defined in claim 31, wherein the first barcode character is associated with a barcode font.

33. An apparatus as defined in claim 31, wherein the second barcode character is associated with a reading capability of a barcode reader.

34. An apparatus as defined in claim 33, wherein the barcode reader is associated with a bars per inch value, and wherein the bars per inch value is associated with determining the second number of pixels.

35. An apparatus as defined in claim 31, wherein the first number of pixels is determined based on a dots per inch value.

36. An apparatus as defined in claim 35, wherein the dots per inch value is associated with a printing system.

37. An apparatus as defined in claim 31, wherein the instructions stored in the memory enable the processor system to modify the at least one of the plurality of separation spaces by at least one of removing a portion of separation space and adding a portion of separation space.

38. An apparatus as defined in claim 31, wherein a width of a first one of the plurality of separation spaces is greater than a width of a second one of the plurality of separation spaces.

39. An apparatus as defined in claim 31, wherein a width of a first one of the plurality of separation spaces is less than a width of a second one of the plurality of separation spaces.

40. A machine accessible medium having instructions stored thereon that, when executed, cause a machine to:
    determine a first number of pixels associated with forming a first barcode character;
    determine a second number of pixels associated with forming a second barcode character;
    compare the first number of pixels with the second number of pixels; and
    modify at least one of a plurality of separation spaces associated with the first barcode character based on the comparison of the first number of pixels and the second number of pixels.

41. A machine accessible medium as defined in claim 40, wherein the first barcode character is associated with a barcode font.

42. A machine accessible medium as defined in claim 40, wherein the second barcode character is associated with a reading capability of a barcode reader.

43. A machine accessible medium as defined in claim 42, wherein the barcode reader is associated with a bars per inch value, and wherein the bars per inch value is associated with determining the second number of pixels.

44. A machine accessible medium as defined in claim 40, wherein the first number of pixels is determined based on a dots per inch value.

45. A machine accessible medium as defined in claim 44, wherein the dots per inch value is associated with a printing system.

46. A machine accessible medium as defined in claim 40, wherein the instructions stored in the memory enable the processor system to modify the at least one of the plurality of separation spaces by at least one of removing a portion of separation space and adding a portion of separation space.

47. A machine accessible medium as defined in claim 40, wherein a width of a first one of the plurality of separation spaces is greater than a width of a second one of the plurality of separation spaces.

48. A machine accessible medium as defined in claim 40, wherein a width of a first one of the plurality of separation spaces is less than a width of a second one of the plurality of separation spaces.

49. An apparatus for modifying a barcode character, comprising:
    a multiplier;
    an adder coupled to the multiplier, wherein the adder and the multiplier are configurable to determine a first number of pixels associated with a first barcode character and a second number of pixels associated with a second barcode character;

a comparator configurable to compare the first number of pixels to the second number of pixels; and a bar modifier configurable to modify the first barcode character based on the comparison of the first number of pixels and the second number of pixels.

50. An apparatus as defined in claim 49, wherein the first barcode character is associated with a barcode font.

51. An apparatus as defined in claim 49, wherein the second barcode character is associated with a reading capability of a barcode reader.

52. An apparatus as defined in claim 49, wherein the bar modifier modifies the first barcode character by at least one of removing a first portion of separation space associated with the first barcode character and adding a second portion of separation space to the first barcode character.

53. An apparatus as defined in claim 49, wherein the first barcode character includes a plurality of separation spaces, and wherein a width of a first one of the plurality of separation spaces is greater than a width of a second one of the plurality of separation spaces.

54. An apparatus as defined in claim 49, wherein the first barcode character includes a plurality of separation spaces, and wherein a width of a first one of the plurality of separation spaces is less than a width of a second one of the plurality of separation spaces.

* * * * *